UNITED STATES PATENT OFFICE.

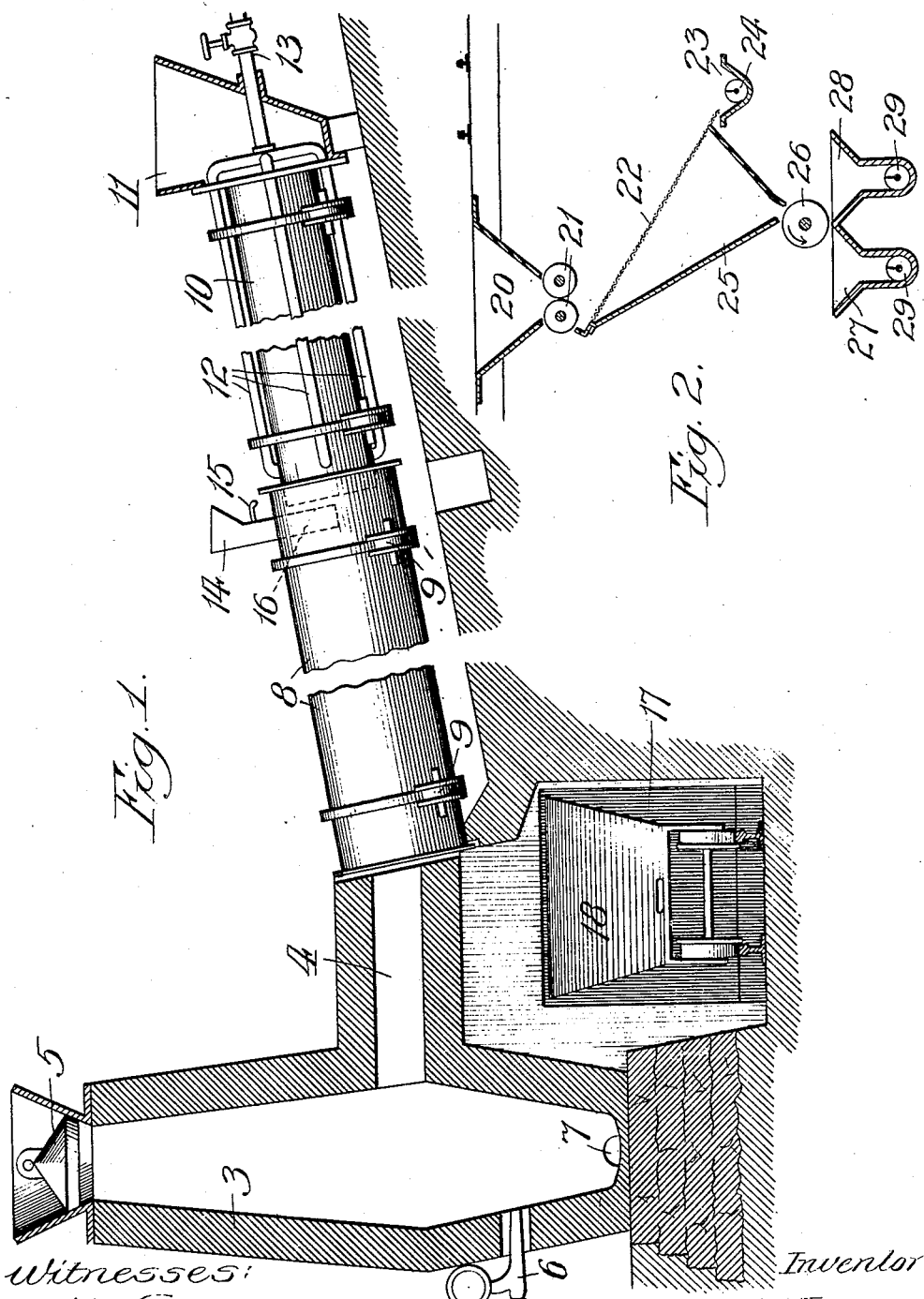

JOHN T. JONES, OF IRON MOUNTAIN, MICHIGAN, ASSIGNOR OF ONE-HALF TO GEORGE A. ST. CLAIR, OF DULUTH, MINNESOTA.

METHOD OF TREATING ORE.

No. 891,705.

Specification of Letters Patent.

Patented June 23, 1908.

Application filed April 11, 1908. Serial No. 426,455.

*To all whom it may concern:*

Be it known that I, JOHN T. JONES, a citizen of the United States, residing at Iron Mountain, in the county of Dickinson and State of Michigan, have invented a new and useful Improvement in Methods of Treating Ores, of which the following is a specification.

My invention relates to an improved method of treating oxid of iron ores, and particularly those of low grade, for the purpose of metallizing oxid constituents and eliminating slag-making constituents preparatory to subjecting the resultant concentrates to further treatment requiring a higher temperature.

It has been the usual practice hitherto when dealing, for example, with magnetite of a grade too low for economical smelting in a blast-furnace, to first crush the ore, if not already in finely divided condition, and then subject the mass to magnetic separation to produce a concentrate of comparatively high grade. In the case of low-grade hematite it has been suggested, at least, to submit the ore first to a roasting operation which would change the non-magnetic oxids to magnetic oxids, then crush the mass, if not already in finely divided condition, and then subject it to magnetic concentration. Both of these methods contemplate raising the grade of the ore to prepare it for economical smelting, but the methods are expensive and the results thus far obtained have not, so far as I am aware, been found sufficiently desirable to warrant their practice to any very great extent.

My object is to provide a comparatively inexpensive and highly effective method of treating iron ores to reduce the metallic oxid constituent, for the most part at least, to metal and separate it, more or less completely, from the non-metallic constituents, thereby to prepare it for further treatment in a balling, melting or other furnace.

In carrying out my invention I pass the ore through a kiln, which may be of vertical chimney form or in the form of an inclined rotating cylinder, and subject it in its passage through the kiln to the action of a deöxidizing atmosphere at a temperature which will reduce iron oxids to metal without melting either the iron or the slag-making constituents. Toward the upper end of the kiln I prefer to admit air to mingle with the reducing gases and promote combustion to burn off a large percentage, at least, of any sulfur contents of the ore, and also preheat the ore before it enters the reducing atmosphere. I may also charge or inject a small quantity of fresh hydro-carbon fuel into the upper portion of the kiln to subject the fuel to distillation at a temperature, say, below 1400° F. to aid in carrying off any phosphor contents of the ore before the latter reaches a temperature which will bind phosphorus to the iron. As the metallic oxids become metallized by the reducing action in the kiln the particles thereof tend to agglomerate, to a large extent, and form honey-comb structures to which the slag-making constituents adhere or with which they are incorporated; and the reactions which take place during the reducing operation tend to render the slag-making constituents more easy to pulverize.

When the reduced ore is discharged from the lower end of the kiln it is permitted to cool out of contact with a reoxidizing atmosphere. When sufficiently cooled for proper handling I subject the ore to disintegration preferably by passing it through crushing-rolls. In this operation the larger lumps of metal will become more or less flattened out and the slag-making constituents will become more or less pulverized. From the rolls I pass the disintegrated mass over screens which will sift out, from the larger pieces or flakes of metal, the pulverized slag-making material and fine metallic particles. The lumps or flakes of iron which do not pass through the screen are collected and saved. The screenings from the larger pieces of metal will naturally contain a large percentage of metallic iron in finely divided condition, and I therefore subject the mass that passes through the screen to magnetic separation to collect and save the metallic particles. The larger flakes or lumps as well as the finer iron particles thus collected and saved may be very nearly pure if the separating operation is carefully performed. The iron concentrates may be formed into briquets by mixing therewith a suitable binder, such, for example, as coal-tar or cement, to protect the metal against reoxidation and put the concentrates into a form for ready handling and charging into a balling or melting furnace.

In the accompanying drawings I show, for purposes of illustration, apparatus suitable for carrying out the steps of my improved method.

Figure 1 is a view partly in section and partly in side elevation of a furnace structure in which the steps of desulfurizing, dephosphorizing and reducing the ore may be carried on; and Fig. 2 a diagrammatic illustration of apparatus for crushing, screening and magnetically separating the reduced ore.

3 is a furnace or gas-producer having a gas-outlet 4. The fuel is fed through a bell-valve 5 and air to support combustion enters through the twyer 6. Unvolatilized products of combustion may be withdrawn through the opening 7.

8 is a kiln in the form of an inclined cylinder which abuts against the mouth of the flue 4 and is supported to rotate on rollers 9.

10 is an extension of the kiln, being in effect a continuation of the cylinder 8 and supported to rotate therewith. At its upper end the cylinder 10 rotates in a stationary hopper 11. Air-supplying pipes 12 enter the lower end-portion of the cylinder 10 leading thereto from a common air-supply pipe 13. On the upper end-portion of the cylinder 8 is a hopper 14 provided with a valve 15, the hopper communicating with a pipe 16 which terminates at about the axial center of the cylinder. Below the lower end of the cylinder 8 is a pit 17 into which cars 18 may be passed to receive the ore discharged from the kiln.

The deoxidizing gases generated in the furnace 3 escape through the flue 4 into the lower end of the kiln and as they enter the cylinder 10 they are mixed with air from the pipes 12, which promotes combustion. The ore to be treated is fed through the hopper 11 and as it passes through the cylinder 10 it is subjected to an oxidizing atmosphere which tends to drive off sulfur and pre-heat the ore before it descends into the cylinder 8. In the latter cylinder the ore is subjected to a reducing atmosphere which is maintained at a temperature sufficiently high to reduce iron oxids to metal, without, however, rendering either the metallic iron or slag-making constituents fluid. Occasionally, as desired, I feed a more or less limited quantity of preferably bituminous coal through the hopper 14 into the cylinder. The temperature at the upper end of the cylinder 8 is high enough to free the volatiles from the hydro-carbon fuel fed through the hopper 14, and these volatiles mixed with the reducing gases from the furnace 3 tend to combine with any phosphoric acid in the ore and carry it out. It is to be understood, of course, that the temperature in the upper part of the cylinder 8 is not high enough to bind phosphorus to the iron. The action upon the ore as it slowly descends through the cylinder 8 is first to more or less completely dephosphorize it and then more or less completely reduce the iron oxids to metal. The pit 17 is of air-tight construction and means are provided for passing cars 18 in and out without admitting a material quantity of air. The reduced ore as it passes from the lower end of the kiln discharges into the cars 18, and when a car is filled ready for removal its contents may be covered with coal-dust or the like to exclude the atmosphere and prevent reoxidation of the ore while it is cooling in the car. When the contents of a car have cooled down sufficiently they may be dumped into the hopper 20 and caused to pass between rotating crusher-rolls 21. The effect of this crushing operation is to flatten out any honey-comb lumps of metal and pulverize the earthy constituents of the ore. From the rolls 21 the mass drops upon the screen 22 down which the larger metal particles run to a trough 23 containing a conveyer 24 which carries them off. The more finely divided portions of the mass fall into a hopper 25 which directs them to a magnetic separator 26. The action of this separator is to separate the iron particles and discharge them into a hopper 27 while the non-metallic constituents of the ore fall into the hopper 28. Each of the hoppers 27, 28 may be provided with a conveyer 29 for carrying off the material collected therein.

It is desirable after the iron has been separated and saved, as described, to protect it against oxidizing, and this may be done by mixing therewith a suitable binder, such as coal-tar or cement, to form a plastic mass which may be molded into briquets and dried. The binder will shield the metal against the oxidizing influence of the atmosphere. Furthermore, briquetting the iron puts it into convenient form for handling and charging into a melting or balling furnace for further treatment.

The apparatus shown and described may, of course, be varied in any way desired for convenience in carrying out my method, and forms no part of my present invention.

What I claim as new and desire to secure by Letters Patent is—

1. The method of treating iron ore, which consists in subjecting a mass thereof under deoxidizing conditions to a temperature that will reduce iron oxids to metal without melting the iron or slag-making constituents, then crushing the mass to pulverize the earthy constituents, then separating the iron from the earthy particles.

2. The method of treating iron ore, which consists in subjecting a mass thereof under deoxidizing conditions to a temperature that will reduce iron oxids to metal without melting the iron or slag-making constituents, then cooling and crushing the mass to pulverize the earthy constituents, then screening the mass to separate therefrom the larger pieces of iron, then subjecting the screenings to magnetic separation to save the iron particles.

3. The method of treating iron ore, which consists in subjecting a mass thereof under deoxidizing conditions to a temperature that will reduce iron oxids to metal without melting the iron or slag-making constituents, then crushing the mass to pulverize the earthy constituents, then separating the iron from the earthy particles, then mixing a binder with the iron and forming it into briquets.

JOHN T. JONES.

In presence of—
L. HEISLAR,
R. SCHAEFER.